United States Patent Office 3,335,579
Patented Aug. 15, 1967

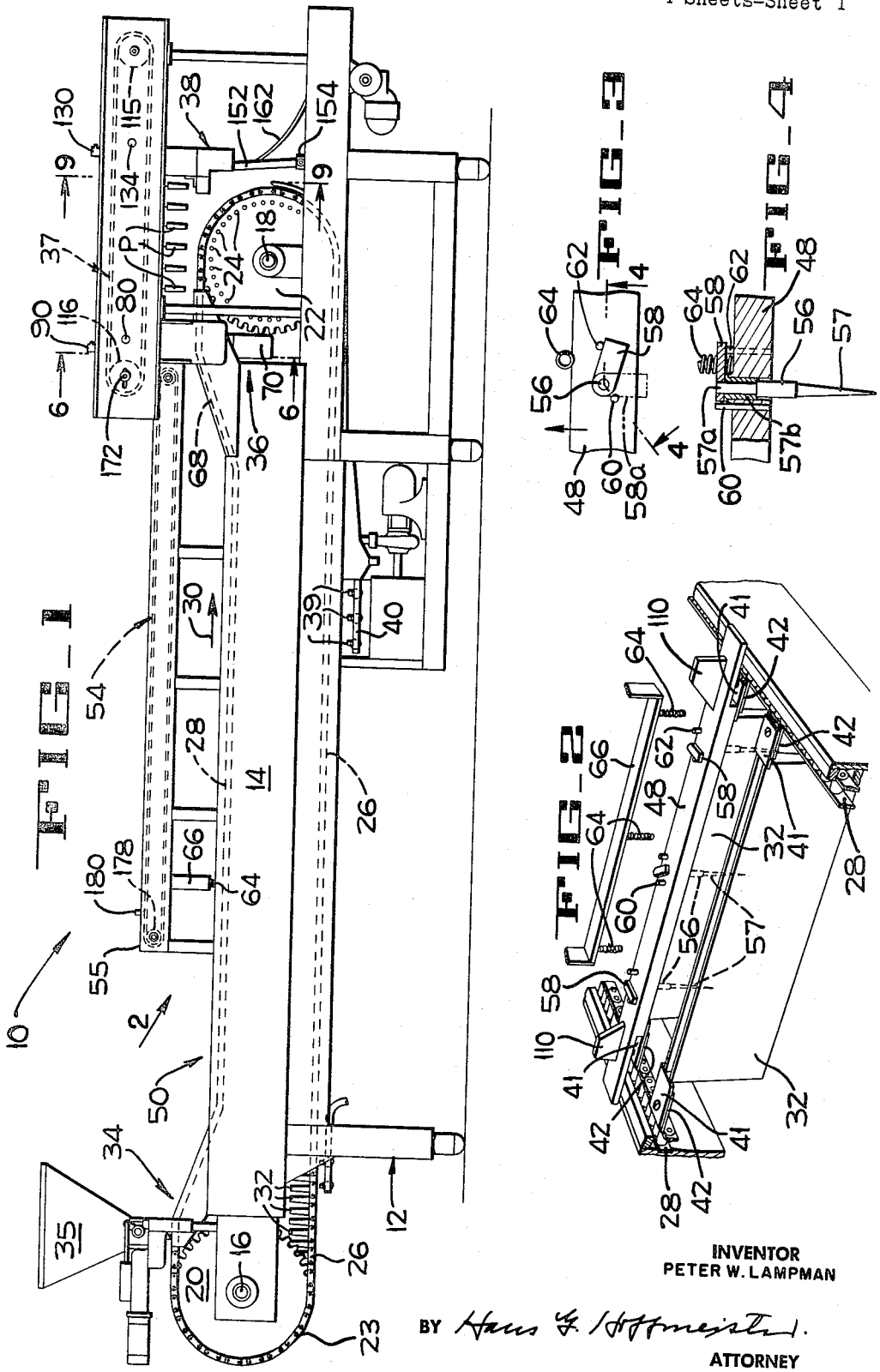

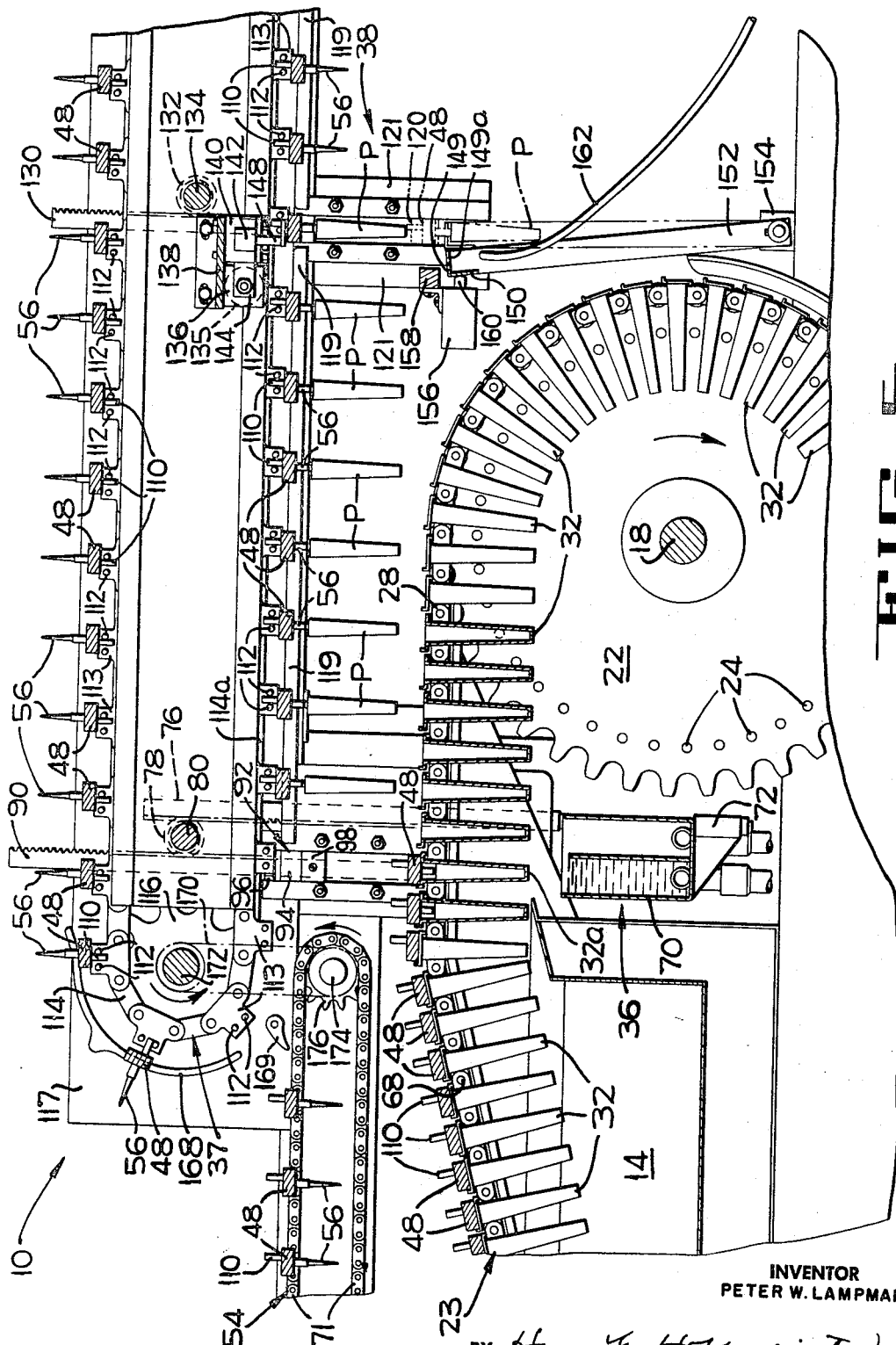

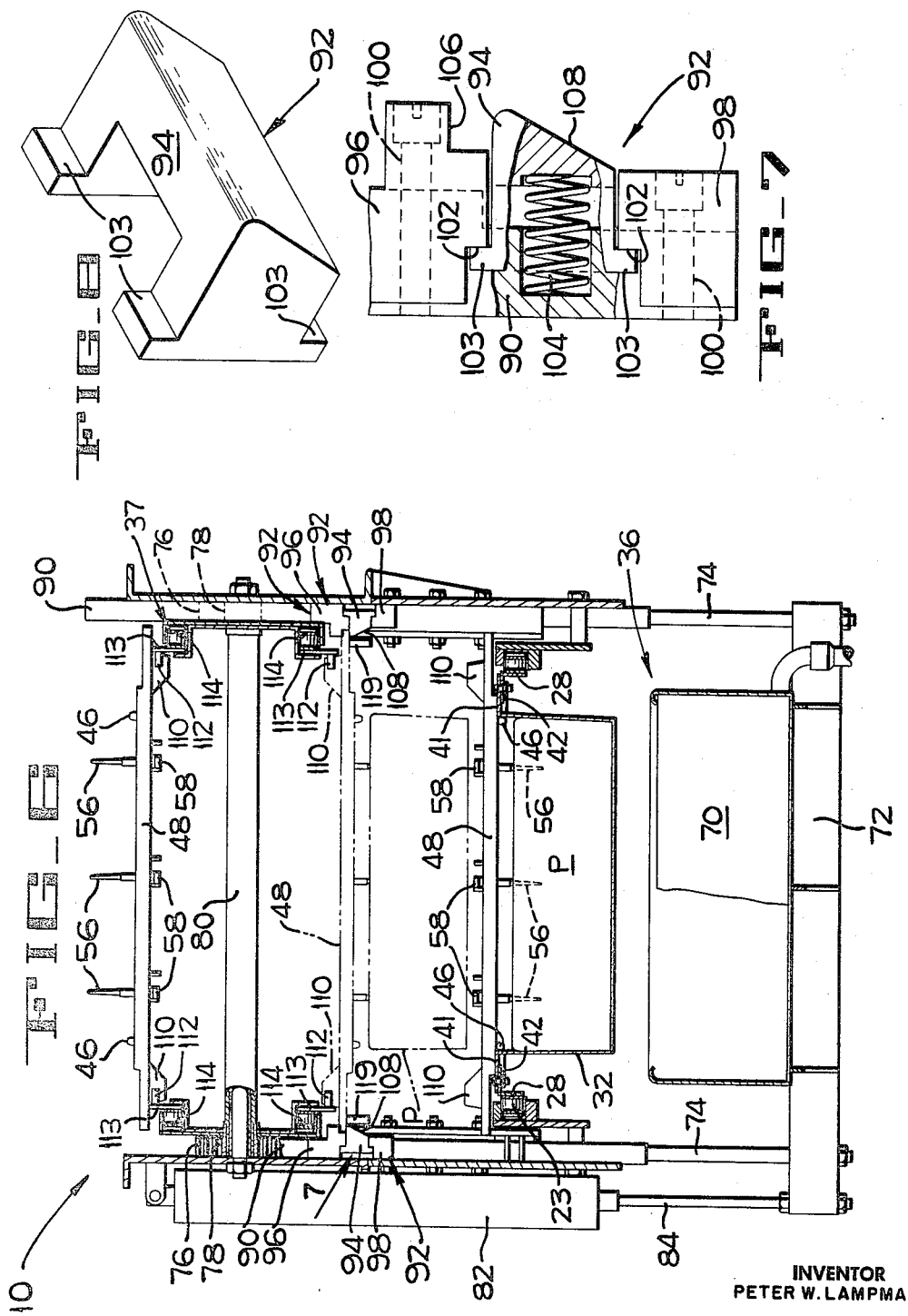

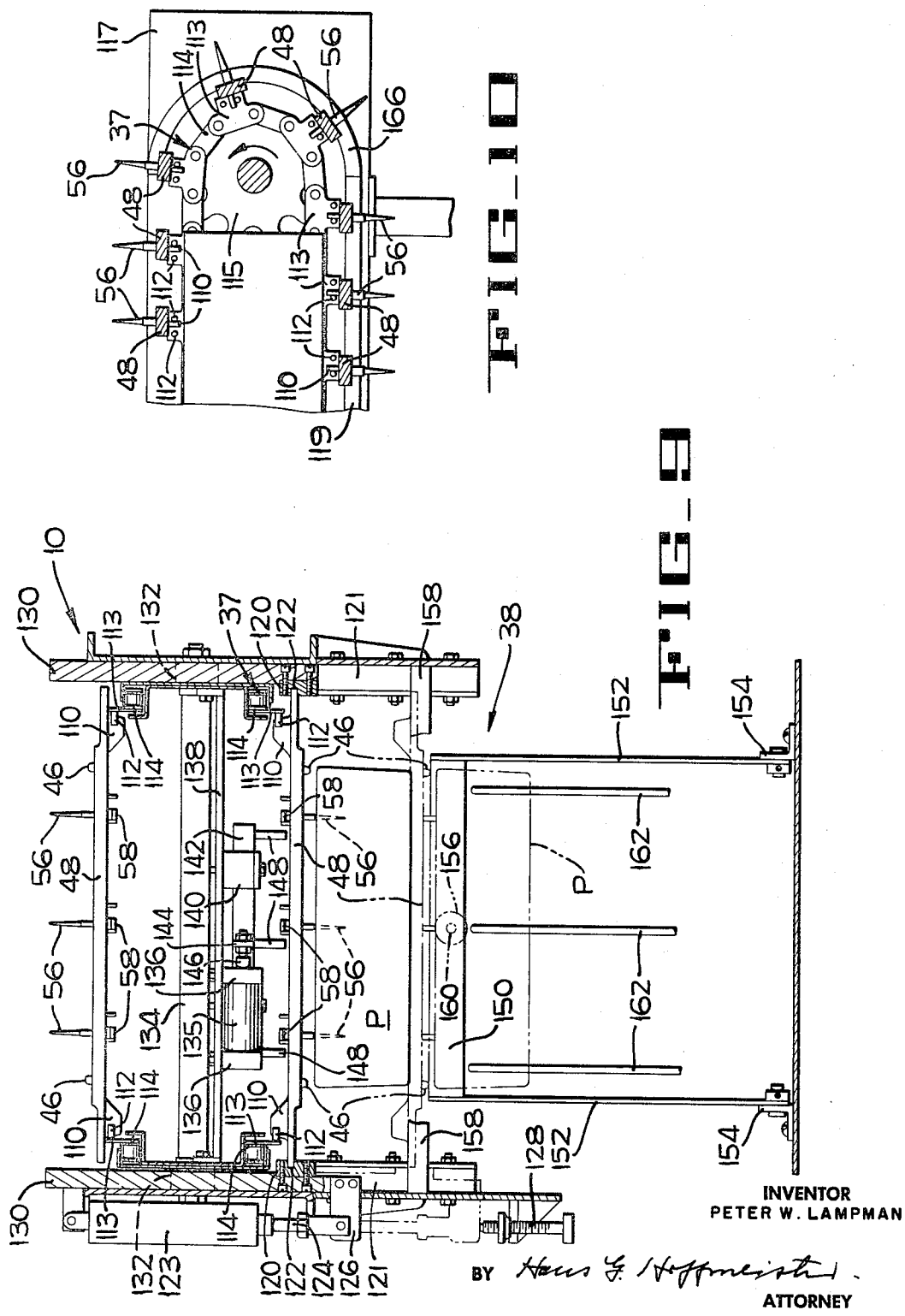

3,335,579
MACHINE FOR FORMING FROZEN FOOD PRODUCT BARS
Peter W. Lampman, East Kew, Victoria, Australia, assignor to FMC Corporation, San Jose, Calif., a corporation of Delaware
Filed Dec. 16, 1965, Ser. No. 514,236
8 Claims. (Cl. 62—345)

ABSTRACT OF THE DISCLOSURE

An endless conveyor frozen comestible machine includes a first or main mold conveyor, a second conveyor for the frozen product carriers, a product carrier pin rotating device at the second conveyor product discharge station, a product stripper at the discharge station, a carrier return conveyor, grippers for transferring carriers from the second conveyor to the carrier return conveyor, and an abutment at the third conveyor for setting the carrier pins.

---

The present invention pertains to machines for the continuous production of frozen bars from liquid or plastic mixtures. More specifically, the invention concerns apparatus for forming and handling rectangular frozen bars that do not have sticks, handles or other projections.

According to the present invention, each product bar is frozen around rotatable pins carried by an associated support carrier, termed an extractor, lying over the mold. Each extractor is capable of being drivingly engaged with, and automatically transferred among, three separate conveyors. The first conveyor moves the extractors and associated molds through a brine tank where the product in the molds is frozen to the pins on the extractors. The extractors and their frozen product bars are then individually transferred to the second conveyor where the frozen bars are stripped from their associated pins and are discharged for packaging. The thus-emptied extractors are then transferred from the second conveyor to the third conveyor which returns the extractors for accumulation at a loading station at the inlet end of the machine for another cycle. Meanwhile, the emptied molds of the first conveyor are automatically washed and returned to the loading station.

One of the objects of the present invention is to provide an improved machine for forming frozen bars from liquid or plastic comestibles.

Another object of the invention is to provide improved means for temporarily supporting and conveying frozen product bars in a freezing machine.

Another object is to provide improved means for respectively supporting and transferring frozen product bars on and between adjacent conveyors.

A further object is the provision of improved means for handling frozen handle-less product bars without damaging the exposed surfaces of the bars.

A further object is to provide improved apparatus for stripping frozen product bars from their molds.

Another object is to provide a structural organization in which elongate support bars for frozen products are transferred between oppositely moving conveying flights.

Other objects and advantages of the present invention will become apparent from the following description and accompanying drawings, wherein:

FIGURE 1 is a diagrammatic side elevation of the frozen product machine of the present invention.

FIGURE 2 is a fragmentary diagrammatic perspective of the general area indicated by the arrow 2 on FIGURE 1.

FIGURE 3 is a diagrammatic plan of part of the structure shown in FIGURE 2.

FIGURE 4 is a diagrammatic vertical section taken along lines 4—4 on FIGURE 3.

FIGURE 5 is an enlarged diagrammatic vertical section through the right-hand discharge end portion of the machine shown in FIGURE 1.

FIGURE 6 is a fragmentary, enlarged diagrammatic section taken along lines 6—6 on FIGURE 1.

FIGURE 7 is an enlarged section of a latch mechanism indicated by the arrow 7 on FIGURE 6.

FIGURE 8 is a perspective of the latch bolt shown in FIGURE 7.

FIGURE 9 is an enlarged fragmentary transverse section taken along lines 9—9 on FIGURE 1, and is at an enlarged scale.

FIGURE 10 is an enlarged fragmentary longitudinal section of that portion of the machine shown at the upper right corner of FIGURE 1.

In general, the frozen product machine 10 (FIG. 1) includes a floor mounted frame 12 which supports an elongate brine tank 14, an idler shaft 16 and a driven shaft 18. Mounted on each shaft 16 and 18 is a pair of laterally spaced idler sprockets 20 and a pair of drive sprockets 22 (FIG. 1) only one sprocket of each pair being shown. The drive sprockets 22 are intermittently rotated by a drive mechanism that may be of the type disclosed in the Rasmusson Patent No. 3,031,978 which is included by reference herein. In general the drive mechanism includes a hydraulic ram which carries a pivoted pawl for engaging inwardly projecting drive pins 24 on each drive sprocket.

The pairs of sprockets 20 and 22 (FIG. 1) carry endless chains of a main conveyor 23 that has lower flights 26 and upper flights 28, the latter of which move intermittently in the direction of the arrow 30 longitudinally of the brine tank 14. Transversely extending molds 32 are mounted on the main conveyor chains for movement along a circuitous path past a filling station 34 at which a dispensing mechanism 35, of the type disclosed in the patents to Rasmusson No. 2,850,051 and No. 2,850,990, automatically fills each mold with the liquid or plastic product to be frozen. Each mold is designed to form a frozen bar that is about 17 inches long, one-half inch thick and about 4 and one-half inches deep. The mold has slanted inner walls so that the portion of the bar at the top of the mold is slightly larger in cross section than the portion at the bottom of the mold.

The present invention particularly concerns a removable carrier member or extractor, which is manually positioned on each mold as it leaves the filling station 34, and has depending portions to which the product is ultimately frozen. After freezing, the extractor is separated from the mold with its frozen product bar attached thereto. Thus, the filled molds 32 move through the brine tank 14 to freeze the product in the molds, and the molds are emptied at a mold defrosting station 36 where the then frozen product bars P and their associated extractors are transferred onto a second intermittently operated conveyor 37 which will be referred to as a stripper conveyor.

The frozen bars are removed from their extractors at a discharge station 38, and the molds return to the feed hopper via the lower chain flights 26. During return of the molds, they are washed by means including spray heads 39 on a manifold 40, and then follow through the same filling, freezing and washing cycle. The stripper conveyor 37 transfers the extractors onto a third conveyor 54, that is called an accumulation conveyor, which returns the extractors to a point downstream from the filling station 34 for another cycle.

More specifically, each mold 32 (FIG. 2) includes outwardly extending end tabs 41 which are bolted or riveted to a corresponding lug portion of an attachment link 42 of the main conveyor chains. At a level section 50 (FIG. 1) of the chain flights 28 downstream of the filling station 34, an operator manually places an extractor 48 over each mold 32. A pair of bosses 46 (FIG. 6) that has generally frusto-conical lower ends are integrally formed on the underside of each extractor and, when the bar is placed over the mold, the bosses engage the end and side walls of the mold to center the extractor relative to the mold.

Each extractor 48 (FIGS. 2 and 6), is moved with the mold through the brine tank 14, and the product in the mold is frozen fast to three rotatable, depending pins 56. Each pin 56 (FIGS. 2–4) has a tapered lower end portion 57, and an upper portion 57a which is disposed in a flanged bearing 57b and extends through the extractor 48. An actuating lever 58 is secured to the upper end portion of the pin, and the pin is rotatable between the limits of movement afforded by stop pins 60 and 62 which are mounted on the extractor 48 to arrest swinging movement of the lever 58. At the discharge station 38, power mechanism rotates the pins 56 to break the frozen bond between the pins and the frozen product to facilitate removal of the product.

When a bar is frozen on the lower ends of the pins 56, the actuating levers 58 of the pins should be in the phantom line position of FIG. 3, against the stop pin 60. Each lever 58 is moved to a predetermined or "set" position which conditions the actuating lever for later contact with a lever operator, to free the pin 56 from the frozen product. This setting of each lever 58 is performed by a coil spring 64 (FIGS. 2–4) before the product freezes in the molds. The coil springs 64 are mounted in depending relation on a fixed support 66 near the inlet end of the brine tank 14, and each spring, as shown in FIGURE 3, lies in the path of those levers 58 which are not in the desired position. The springs thus turn the levers 58 as the extractors 48 travel past, so that downstream of the springs 64 all of the levers 58 are in the phantom line, set position 58a (FIG. 3).

By the time each mold 32 (FIGS. 1 and 5) is lifted from the brine tank 14 by means of upwardly inclined portions of the conveyor flights 28, at 68, the product in the mold is frozen to the pins 56 on the extractor. Then, at the mold defrosting station 36, the extractors and their associated frozen product bars P are successively lifted from the molds 32 after the frozen bond between the product bars and the mold is broken. For this purpose, a thawing tank 70 containing hot water is mounted for vertical reciprocation and while the superposed one of the molds 32 is moved downwardly toward the tank, the thawing tank 70 is lifted upward into surrounding and heating relation with the mold to thereby free the frozen product bar therein.

The thawing tank 70 (FIGS 5 and 6) is mounted upon a cross strap 72 which is secured to the lower end portions of vertical rods 74 each of which has an upper portion rack 76. The racks 76 are in meshing engagement with the downstream sides of associated pinion gears 78 that are secured to the opposite end portions of a shaft 80. Thus mounted, uniform movement of each end of the cross strap 72 and thawing tank 70 is assured when an air cylinder 82, the piston rod 84 of which is secured to one end of the strap 72, is energized to elevate or lower the thawing tank.

The pinion gears 78 (FIGS. 5 and 6) are associated with the stripper conveyor 37, that overlies the drive sprockets 22 and is arranged to convey the frozen product bars P between the product removal station 36 and the discharge station 38 at which the product bars are removed from their support pins 56. A further function of the pinion gears 78 is to actuate mechanism which lifts the extractors 48 and their attached frozen product bars from the molds, into supported relation with the stripper conveyor 37, after the frozen bars are freed from the molds. The upstream side of each pinion gear 78, as shown for the gear illustrated in FIGURE 5, is meshed with a rack 90 which is guided for vertical movement between spaced guide bars. The two racks 90 are located in a vertical plane that contains a hot water chamber of tank 70 and, when the main conveyor 23 and the stripper conveyor 37 are stationary between intermittent actuations, a mold 32 is in said plane. When the pinion gears 78 are rotated by the racks 76, the racks 90 move downwardly as the thawing tank 70 is moved upwardly to a position wherein the mold is disposed in the hot water.

A latch mechanism 92 (FIGS. 7 and 8) is secured to the lower end portion of each rack 90, the purpose of which is to grip the adjacent end of the extractor 48 which is disposed on the mold at the mold defrosting station 36 so that, when the racks 90 are raised the bar of frozen product will be pulled upwardly out of the defrosted mold.

The latch 92 includes a horizontally movable latch bolt 94 which is of U-shape and straddles the rack 90. Respectively disposed above and below the latch bolt 94 are fixed guide members 96 and 98 which are also U-shaped and straddle the rack. Each guide member is secured to the rack by a screw 100, and has a notched portion 102 that forms an abutment stop for upright lug portions 103 of the latch bolt 94. A compression spring 104 is mounted in a blind recess in the rack 90 and urges the latch bolt 94 outward, in which position it lies in a vertical plane including the corresponding end portion of the extractor 48 (FIG. 6) and below a ledge 106 (FIG. 7) that is formed on the upper fixed guide member 96.

The two confronting latch bolts 94 (FIG. 6) have downwardly, outwardly inclined camming surfaces 108 which, when the racks 90 are moved downward upon actuation of the air cylinder 82, engage the extractor 48 and are temporarily cammed aside until the end portions of the extractor 48 engage the ledges 106, after which the latch bolts spring inward to underlie the extractor and carry it upward when the racks 90 are subsequently elevated. The extractor 48 (FIGS. 5 and 6) will thus be elevated to the FIGURE 6 phantom line position in which an upstanding tap portion 110 on each end portion lies between inwardly projecting drive pins 112 (FIG. 5) that are mounted on special links 113 of laterally spaced endless chains 114 of the stripper conveyor 37. When the conveyor 37 is next actuated, the pins 112 will slide the extractor out of the latches and move it and the depending bar of frozen product away from the mold defrosting station.

The chains 114 are trained around spaced pairs of drive and idler sprockets 115 and 116, respectively, only one of each sprocket being shown. The drive means for the sprockets 115 is hidden by one of the side plates 117 (FIG. 10) of the stripper conveyor, but is the same drive means employed in the previously identified Rasmusson patent.

The next incremental movement of the lower flight 114a (FIG. 5) of the stripper conveyor 37 slides the end portions of the extractor 48 downstream and onto fixed support rails 119. The operations described thus far, cause the gripping of the extractor 48 by the latch mechanism 92, the thawing of the bond between the frozen product bar P and the mold, and the transferring of the frozen product bar P to the stripper conveyor 37 while the mold continues along its former path on the main conveyor flight 28. The bond between the pins 56 and the frozen product bars P is not disturbed by the hot water in the thawing tank 70. The bars P are carried by the extractors 48 toward the discharge station 38 where the bars are separated from the pins 46 before they are discharged for packaging.

The support rail 119 (FIG. 5) at each side of the stripper conveyor 37 is formed in two sections with the confronting ends of the sections spaced apart at the discharge station 38. In the gap thus formed, a downwardly movable slide block 120 (FIG. 9) is positioned in the horizontal plane of the end portions of the extractors 48 in the lower run of conveyor 37. Each of the slide blocks has a slotted portion at 122 which is arranged to slidably receive the associated end of the extractor 48 as it is moved into the gap between the portions of rail 119. While the stripper conveyor 37 is stopped, the slide blocks 120 are moved downward between vertical guide strips 121 with the extractor until the product bar P and the extractor are positioned in the phantom line position illustrated at the discharge station 38 in FIGURES 5 and 9.

Means for lowering the slide blocks 120 and the extractor include an air cylinder 123 (FIG. 9) having a piston rod 124 which is connected to a bracket 126 mounted on the lower end of a rack 130. The lowermost position of the slide blocks can be regulated by an adjustable stop screw 128 which the bracket 126 ultimately abuts when the air cylinder 123 is energized to project its piston rod downward.

The slide blocks 120 are each secured to the lower end portions of the rack 130 which is suitably guided for vertical movement, and which meshes with an associated pinion gear 132. An elevationally fixed, rotatable shaft 134 interconnects the two pinion gears 132 so that the racks 130 partake of uniform movement when the air cylinder 123 is energized.

Before the air cylinder 123 is energized, a small double acting air cylinder 135 (FIG. 9) is automatically actuated to simultaneously rotate the pins 56 away from the stop pins 60 in order to break the frozen bond between the pins and the frozen product bar P. Even though the frozen bond is broken, however, the product bar P remains partially adhered to the pins and can be forcibly pulled from the pins, but will not drop by gravity.

The air cylinder 135 is provided with end mounting blocks 136 that are bolted to the underside of a fixed, transverse strap 138. A slide rod 142 is slidably mounted beside the air cylinder on the same strap 138 by means of guide blocks 140. The slide rod 142 is provided with a lateral arm 144 which is connected to the piston rod 146 of the pin cylinder 135, and depending from the slide rod 142 (FIG. 5) are three operator arms 148 which are disposed so as to strike their associated pin actuating levers 58 when the air cylinder 135 is energized to move the slide rod 142 endwise away from the cylinder. Such action occurs while the extractor is stationary in its FIGURE 9 position, after which the vertical air cylinder 123 is energized to lower the product bar P and the extractor to the phantom line position as previously indicated. In lowered position, the upper surface of the product bar P lies in a plane slightly below a substantially horizontal flange 149 (FIG. 5) of a stripper angle 150 which is parallel to, and longer than the product bar P. When the flange 149 is moved to the phantom line position it overlies the frozen bar and prevents it from moving upwardly when the extractor is retracted upwardly.

A pair of upright levers 152 are secured to the ends of the stripper 150, each lever being pivotally mounted by pivot pin brackets 154 to fixed frame structure beneath the discharge station 38. An air-operated, double-acting stripper cylinder 156 is mounted on a transverse rod 158, adjacent the stripper 150, and has its piston rod 160 connected to the stripper so that the stripper is driven in each direction of piston rod movement.

Before the air cylinder 123 (FIG. 9) lowers the product bar P at the discharge station 38 (FIG. 5), the stripper 150 is held in its illustrated solid line position. After the product bar P is lowered to its phantom line position, the stripper air cylinder 156 pivots the stripper assembly forward, and the flange 149 of the stripper 150 overlies the upper surface of the product bar P. In such position, notched portions 149a in the flange 149 accommodate the pins 56. The air cylinder 123 (FIG. 9) is then energized to elevate the extractor 48 while the stripper 150 (FIG. 5) remains in its phantom line position. The product bar P is thus stripped by the flange 149 from the pins 56 to which it is loosely adhered, and the product bar P drops onto curved, declining rods 162 which form a discharge chute that delivers the product bar onto an adjacent delivery conveyor, not shown.

After the product bar P has been discharged and its extractor 48 returns to its uppermost position between pins 112 of the stripper conveyor 37, the next incremental movement of the stripper conveyor 37 moves the empty extractor 48 downstream away from the discharge station 38 as the next product bar P is moved to the discharge station.

The extractors 48 (FIG. 10) progress along the support rails 119 and slide onto a curved retaining rail 166 at each side of the machine (only one rail 166 being shown) until they reach the upper flights of the chains 114 where gravity causes the extractors to move down into supported relation on the special links 113 of the stripper conveyor. The extractors 48 are thus carried back toward the product removal station 36 in inverted positions.

As each extractor 48 (FIG. 5) approaches top dead center of the idler sprockets 116, each of its relatively thin end portions moves under a curved retaining rail 168 which has an inner surface that is generally concentric with the path of the chains 114. However, the extractors 48 are held in driven engagement with the stripper conveyor 37, as they descend toward the accumulation conveyor 54, until, they progress beyond the lower end of the retaining rail 168. Gravity is then free to cause the extractors 48 to drop away from the stripper conveyor. In so doing, each end portion of the extractor is guided by a fixed guide arm 169, only one being shown, that is adjustably secured to the side plate 117 of the stripper conveyor 37. The guide arms cause the extractors to be transferred onto the upper flight of laterally spaced chains 171 of the accumulation conveyor 54 in upright positions, i.e., positions in which the pins 56 depend from the extractors.

The accumulation conveyor 54 may be conveniently driven by a chain and sprocket drive 170 which interconnects an idler shaft 172, that is keyed to the stripper conveyor idler sprockets 116, and a shaft 174 which is keyed to driven sprockets 176 of the accumulation conveyor, or the accumulation conveyor may have a separate drive means since there is no timing relation required between the stripper and accumulation conveyors. Each of the sprockets 176 is aligned with a similar sprocket 178, only one of which is indicated in FIGURE 1, at the delivery end 55 of the accumulation conveyor 54.

A fixed, transverse stop member 180 may be mounted across the delivery end 55 of conveyor 54 in order to stop and accumulate the extractors 48 if they are not immediately reused such as will happen at the end of a production run. In such case, the chains 171 merely slide under the arrested extractors when they are grouped in abutting relation against the stop member.

It will be apparent that the herein disclosed structure can be modified in an obvious manner without the exercise of further inventive effort to provide extractors with individual support pins 56 for each of a plurality of mold pockets in a single mold strip if the desired end product is the well known ice cream bar or similar confection rather than the special purpose product bar P herein illustrated. In either event, the novel cooperation between the extractors, molds, the main conveyor, stripper conveyor and accumulation conveyor makes possible the rapid, inexpensive and substantially automatic production of handle-less frozen product bars. While the automatic controls are not herein disclosed or claimed, they are not properly a part of the present invention, and are within the capabilities of those persons skilled in the art.

While a particular embodiment of the apparatus of the present invention has been herein shown and described, it will be apparent that modification and variation may be made without departing from the spirit of the invention, and that the scope of the invention should be limited only by proper interpretation of the claims appended hereto.

Having thus described the invention, that which is believed to be new, and for which protection by Letters Patent is desired is:

1. A frozen product machine comprising a frame, an open top mold, first conveyor means on said frame for carrying said mold through a plurality of processing stations, an extractor removably positioned across the open top of said mold, means for supplying product to said mold at a filling station for subsequent freezing, a depending and downwardly tapered pin carried by said extractor for eventual freeze-bonding to the product as the product is frozen solid in the mold, said pin being rotatably mounted in said extractor to facilitate removal of the frozen product from the pin, an actuating lever connected to said pin and movable with the extractor, means for freezing the product in said mold during conveying movement of the mold, means for thawing the frozen bond between the frozen product and said mold, means for removing said extractor from said mold with the frozen product secured to said pin, a second conveyor for receiving said extractor from said removing means, operator means lying adjacent and movable into the path of said pin actuating lever for rotating said pin relative to said extractor to destroy the frozen bond between the frozen product and said pin, and a fixed abutment on said frame and lying in the path of said lever for setting the pin in predetermined relative position to condition the lever before the product is frozen in said mold for contact by said second actuating means.

2. A frozen product machine comprising a frame, an open top mold, first conveyor means on said frame for carrying said mold through a plurality of processing stations, an extractor removably positioned across the open top of said mold, means for supplying product to said mold at a filling station for subsequent freezing, a depending and downwardly tapered pin carried by said extractor for eventual freeze-bonding to the product as the product is frozen solid in the mold, said pin being movably mounted in said extractor so that the frozen product can be removed from the pin, actuating means connected to said pin and movable with the extractor, means for freezing the product in said mold during conveying movement of the mold, means for thawing the frozen bond between the frozen product and said mold, first vertically reciprocable means on said frame for removing said extractor from said mold with the frozen product secured to said pin, an endless second conveyor in said frame above and contiguous to the outlet end of said first conveyor means for receiving said extractor from said removing means, a frozen product discharge station at said second conveyor, second vertically reciprocable means at said discharge station for successively moving said extractor between a raised and a lowered portion, operator means at said discharge station and lying adjacent and movable against said pin actuating means for moving said pin relative to said extractor to destroy the frozen bond between the frozen product and said pin when said extractor is in its raised position, and stripper means operative to move into overlying relation with the frozen product when the extractor is in its lowered position, subsequent upward movement of said extractor stripping the frozen product from said pin.

3. Apparatus according to claim 2 including a third conveyor mounted on said frame above said first conveyor means and having an inlet end adjacent the inlet end of said second conveyor and the discharge end of said first conveyor means, and means for transferring the extractor, after the frozen product bar has been stripped therefrom, from said second conveyor onto said third conveyor for return of the extractor to a loading station upstream from the filling station.

4. Apparatus according to claim 2 and further including a latch carried by said first vertically reciprocable means, said extractor having an end portion subjacent said latch when the extractor is positioned for transfer from said first conveyor means to said second conveyor, downward movement of said latch engaging the latch with said end portion of said extractor for upward movement of the bar coincident with upward movement of said vertically reciprocable means.

5. The apparatus of claim 4 in which said latch includes means defining an inwardly open notch adapted to receive the corresponding end portion of said extractor, the lower end of said notch comprising a movable latch bolt having a camming surface, said surface being arranged to strike and be pushed aside by said extractor upon downward movement of said latch and thereby move the latch bolt so that the notch is open and the end portion of said extractors enters the notch, and means biasing said latch bolt toward a position in which it closes the lower end of said notch and thus underlies said extractor end portion after it is positioned in the notch.

6. A frozen product machine comprising a frame, a first endless conveyor movable in a first path on said frame and having an inlet end and an outlet end on its upper reach, a second endless conveyor mounted in said frame and movable in a second path adjacent the outlet end of said first conveyor, said second conveyor having an inlet end adjacent the outlet end of said first conveyor, a third endless conveyor and having its lower reach moving in the same direction as the upper reach of said first conveyor mounted on said frame above said first conveyor and having an inlet end adjacent both the inlet end of said second conveyor and the outlet end of said first conveyor, the outlet end of said third conveyor being adjacent the inlet end of said first conveyor, the upper reach of said third conveyor moving oppositely to the upper reach of said final conveyor, carriers engaged at an initial position with the inlet end of said first conveyor and arranged to carry a frozen product, means on said frame vertically reciprocable between said first and second conveyors for gripping and transferring said carriers with product frozen thereto from said first conveyor onto the lower reach of said second conveyor, means adjacent said second conveyor disposed within the path of the product frozen to said carriers and operable to strip the product therefrom, and means for transferring the thus empty carriers from the upper reach of said second conveyor onto the upper reach of said third conveyor for return to positions adjacent the inlet end of said first conveyor.

7. Apparatus according to claim 6 wherein said carriers comprise extractors individually provided with rotatable pins which depend from each extractor when the extractor is upright and are arranged to be freeze-bonded to the product when it is frozen, and a plurality of open top molds arranged for conveying movement by said first conveyor and each having an upright extractor removably positioned across the open top of the mold with said pins depending into the mold cavity.

8. Apparatus according to claim 7 wherein said extractors are inverted during movement along the upper flight of said second conveyor and move in a direction opposite to the direction of movement of the upper flight of said third conveyor as they approach their upright positions and point of transfer adjacent the lower flight of said second conveyor, and wherein said means for transferring the empty extractors onto said third conveyor includes means for guiding the substantially upright extractors while the extractors drop by gravity onto the upper flight of said third conveyor.

References Cited

UNITED STATES PATENTS

| | | | |
|---|---|---|---|
| 2,062,754 | 12/1936 | Loewenstein | 107—8 |
| 2,625,120 | 1/1953 | Eddy et al. | 107—8 |
| 2,644,409 | 7/1953 | Huebsch | 107—8 |
| 2,761,398 | 8/1956 | Wusner | 107—8 |
| 3,031,978 | 5/1962 | Rasmusson | 107—8 |

ROBERT A. O'LEARY, *Primary Examiner.*

W. E. WAYNER, *Assistant Examiner.*